United States Patent [19]

Ward

[11] Patent Number: 5,689,447

[45] Date of Patent: Nov. 18, 1997

[54] TEMPERATURE-COMPENSATED, SELF-CALIBRATING, CONTACT-TYPE GAGING SYSTEM AND METHOD FOR CALIBRATING THE SAME

[75] Inventor: Mark Ward, Ypsilanti, Mich.

[73] Assignee: Control Gaging, Inc., Ann Arbor, Mich.

[21] Appl. No.: 565,787

[22] Filed: Dec. 1, 1995

[51] Int. Cl.⁶ .................................................. G01K 5/00
[52] U.S. Cl. .................. 364/571.03; 364/557; 364/560; 73/1 R; 73/716
[58] Field of Search .................... 364/571.01, 571.03, 364/571.05, 571.07, 571.04, 560, 562, 563, 557, 572; 324/130, 132, 225, 207.17, 207.18; 33/702, 555.3; 73/716, 1 J, 1 R; 374/132, 134, 137, 142, 152, 55, 56, 102, 103

[56] References Cited

U.S. PATENT DOCUMENTS

| | | | |
|---|---|---|---|
| 1,889,089 | 11/1932 | De Giers | 33/702 |
| 3,921,300 | 11/1975 | Cox et al. | 33/702 |
| 4,141,149 | 2/1979 | George et al. | 33/555.3 |
| 4,539,777 | 9/1985 | Brown et al. | 33/501.03 |
| 4,761,887 | 8/1988 | Brown et al. | 33/702 |
| 4,872,124 | 10/1989 | Shimizu et al. | 364/571.03 |
| 4,916,391 | 4/1990 | Doerman et al. | 324/207.18 |
| 4,949,469 | 8/1990 | Wachtler | 33/702 |
| 4,956,795 | 9/1990 | Yamaguchi et al. | 364/571.03 |
| 5,052,121 | 10/1991 | Wachtler | 33/813 |
| 5,195,826 | 3/1993 | Enderle et al. | 374/142 |
| 5,446,971 | 9/1995 | Neumann | 33/702 |

*Primary Examiner*—Emanuel T. Voeltz
*Assistant Examiner*—Hal D. Wachsman
*Attorney, Agent, or Firm*—Harness, Dickey & Pierce, P.L.C.

[57] ABSTRACT

A temperature-compensated, self-calibrating, contact-type gaging system and method for calibrating the same. The system is configured to run in a calibration mode and a measurement mode. During the calibration mode, a unique temperature profile is generated for each particular system. The temperature offset includes offset values calculated to compensate for gaging system hardware errors as well as other measurement error caused by temperature variations encountered during gaging applications. In the measurement mode, part size measurements are adjusted by the offsets contained in the temperature profile generated for the gaging system.

10 Claims, 5 Drawing Sheets

Fig. 4

| TEMPERATURE (56) | SUM OF SIZES (54) | NUMBER OF READINGS (58) | |
|---|---|---|---|
| ⋮ | ⋮ | ⋮ | |
| 70.0 | .000300" | 12 | |
| 70.2 | .000168" | 7 | 62 |
| 70.4 | .000000" | 0 | 60 |
| 70.6 | .000110" | 5 | 64 |
| 70.8 | .000357" | 17 | |
| ⋮ | ⋮ | ⋮ | |

Fig. 5

| TEMPERATURE | SUM OF SIZES | NUMBER OF READINGS | |
|---|---|---|---|
| ⋮ | ⋮ | ⋮ | |
| 70.0 | .000300" | 12 | |
| 70.2 | .000168" | 7 | |
| 70.4 | .000278" | 12 | 60 |
| 70.6 | .000110" | 5 | |
| 70.8 | .000357" | 17 | |
| ⋮ | ⋮ | ⋮ | |

Fig. 6

| TEMPERATURE | SIZE OFFSETS |
|---|---|
| ⋮ | ⋮ |
| 70.0 | .000025" |
| 70.2 | .000024" |
| 70.4 | .000023" |
| 70.6 | .000022" |
| 70.8 | .000021" |
| ⋮ | ⋮ |

TEMPERATURE-COMPENSATED, SELF-CALIBRATING, CONTACT-TYPE GAGING SYSTEM AND METHOD FOR CALIBRATING THE SAME

FIELD OF THE INVENTION

The present invention relates generally to gaging systems. More particularly, the present invention relates to temperature-compensated, self-calibrating, contact-type gaging systems and methods for calibrating the same.

BACKGROUND OF THE INVENTION

In-process and post process gaging has long been recognized as a method for improving quality in milling and machining operations. In-process gaging is accomplished by using a gage, such as a contact gage, to measure workpiece dimensions while the workpiece is being worked on by a grinding wheel, lathe or other machining or milling apparatus. Post process gaging is accomplished by using a gage, such as a contact gage, to measure workpiece dimensions after the workpiece has been worked on.

Generally, contact gages have one or more fingers which ride on the part while it is being ground on the grinding machine. A linear variable differential transformer (LVDT) transducer is used to produce an electrical output proportional to the displacement of the gage fingers. The electrical output can be displayed on a monitor and is used to control the milling or machining operation to ensure that the finished workpiece is properly dimensioned. This type of contact gage generally experiences wide temperature flexuations as the part heats up due to friction and is cooled by cooling fluid.

Variation in temperature can have multiple effects on the accuracy of dimensional measurements taken by a gaging system. For example, it is known that certain materials, particularly metals, expand and contract with temperature. As metal workpieces heat up during grinding they expand, making it difficult to obtain an accurate temperature-normalized dimensional reading. Temperature variances can also effect how the gaging equipment operates thus adding a gaging system hardware error. Furthermore, different parts will respond to temperature differently due to size, shape and material.

Temperature-compensated gaging systems have been proposed which are calibrated to correct errors due to the workpiece expansion and contraction caused by temperature variation. However, due to the uniqueness of individual gaging systems, gaging system hardware errors are much harder to correct. Testing has shown that identical LVDT transducers respond differently to temperature changes. Furthermore, the effects caused by the temperature changes are not linear. For this reason a standard scaling factor will not correct the effects caused by changes in temperature.

Thus, there is a need for a highly accurate temperature-compensated, self-calibrating gaging system. There is also a need for a self-calibrating gaging system which can easily and accurately compensate for gaging system hardware error as well as other errors caused by temperature variations. There is a still further need for a method of accurately calibrating temperature-compensated gaging systems to account for temperature variations encountered during in-process gaging applications.

SUMMARY OF THE INVENTION

The present invention provides a temperature-compensated, self-calibrating contact-type gaging system and method for calibrating the same. The gaging system includes a gage head having gage fingers, an LVDT transducer and an internal temperature probe. The gage fingers contact the part on the surface to be measured. The LVDT transducer produces an electrical output proportional to the displacement of the fingers and the temperature probe produces an output indicating the temperature at the gage head.

One object of the present invention is to provide a highly accurate temperature-compensated, self-calibrating gaging system for use during gaging applications.

Another object of the present invention is to provide a self-calibrating gaging system which can easily and accurately compensate for gaging system hardware errors as well as other measurement errors caused by temperature variations encountered during gaging applications.

It is still another object of the present invention to provide a method for accurately calibrating temperature-compensated gaging systems to account for temperature variations encountered during gaging applications.

In order to achieve the foregoing objects, the gaging system is configured to run in either a calibration mode or a measurement mode. The calibration mode is used to uniquely calibrate the gaging system to compensate for variation in temperature. The measurement mode is used during in-processes gaging to monitor the part size as the part is being worked on or in post-process applications to measure part size after the work has been done.

During the calibration mode a temperature profile is generated including calculated offset values for each temperature in the temperature profile range. The offset values are calculated to compensate for gaging system hardware errors as well as other measurement errors caused by temperature variations encountered during gaging applications. The temperature profile is generated by taking periodic part size and temperature measurements on a part of known size over a temperature calibration period during which the gaging system temperature varies. After a sampled temperature profile is generated, missing values are interpolated and the temperature profile is smoothed with a narrow width averaging filter. The ends of the sampled temperature profile are extrapolated out to the limits of the available measurement span by extending the extremes of the sampled profile by using the average slope of the profile near each extreme. Finally the extended temperature profile is smoothed with a wide width averaging filter having a wider bandwidth than the narrow averaging filter to produce the calibrated temperature profile of the gaging system.

In the measurement mode, the gaging system takes part size and temperature measurements at predetermined intervals while the parts are being worked on. The part size measurements are adjusted by looking up in the temperature profile calibrated for the gaging system an offset value corresponding to the measured temperature. Therefore, the resulting part size measurement is an accurate, temperature compensated measurement which can be used to control milling or machining operations being done on the part.

Further objects, features and advantages of the invention will become apparent from a consideration of the following description and the appended claims when taken in connection with the accompanying drawings.

BRIEF DESCRIPTION OF THE DRAWINGS

FIG. 4 is a schematic view showing a portion of a sampled temperature profile table according to the present invention;

FIG. 5 is a schematic view showing a portion of the temperature profile table of FIG. 4 with missing data filled in by interpolation;

FIG. 6 is a schematic view showing a portion of an offset temperature profile table according to the present invention;

DETAILED DESCRIPTION OF THE PREFERRED EMBODIMENT

Preferred embodiments of the temperature-compensated, self-calibrating, contact-type gaging system and method for calibrating the same are described herebelow with reference to the drawings.

Figure 1:
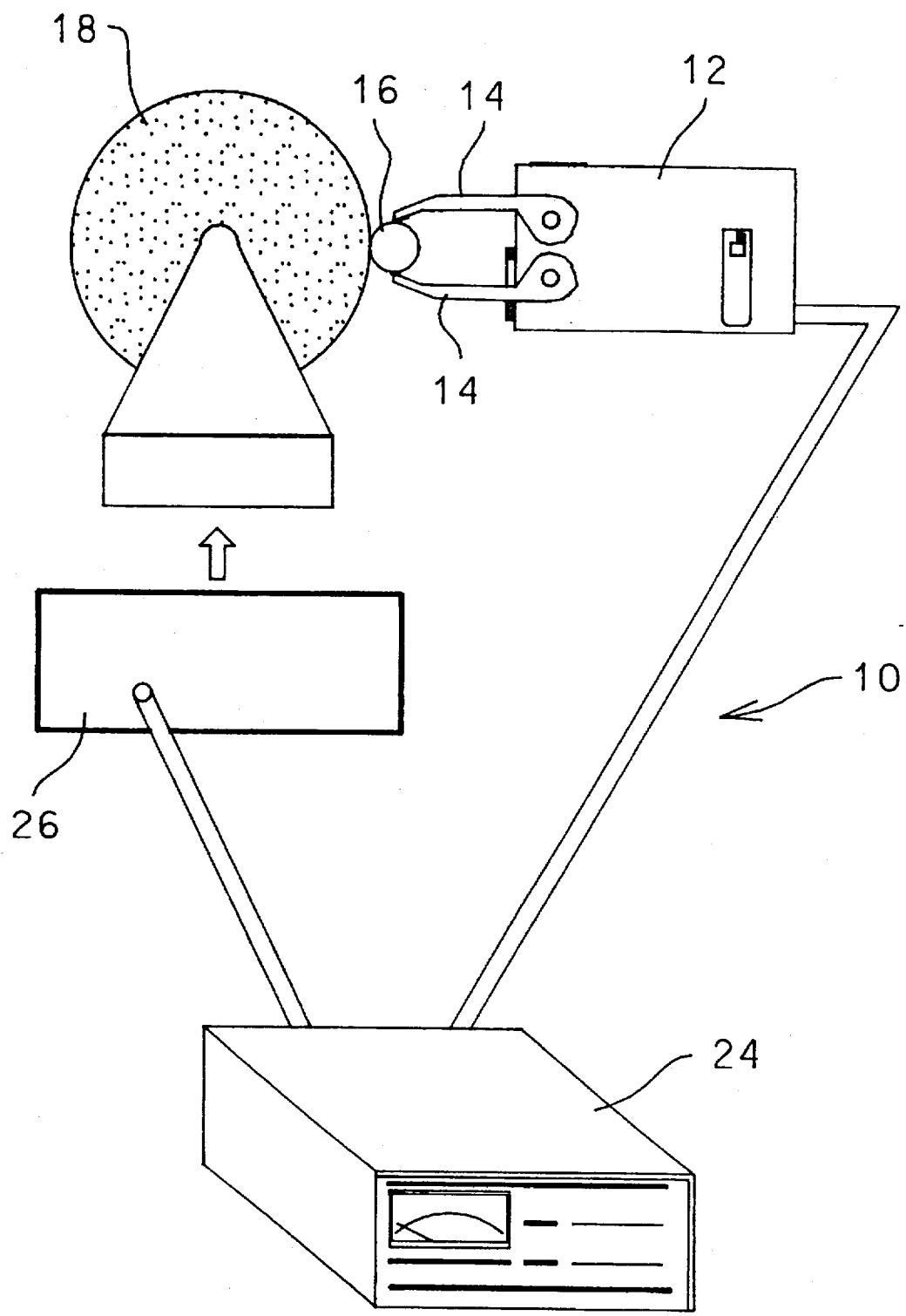
FIG. 1 is a schematic view of a temperature-compensated, self-calibrating, contact-type gaging system being used in an in-process application according to the present invention.
Figure 2:
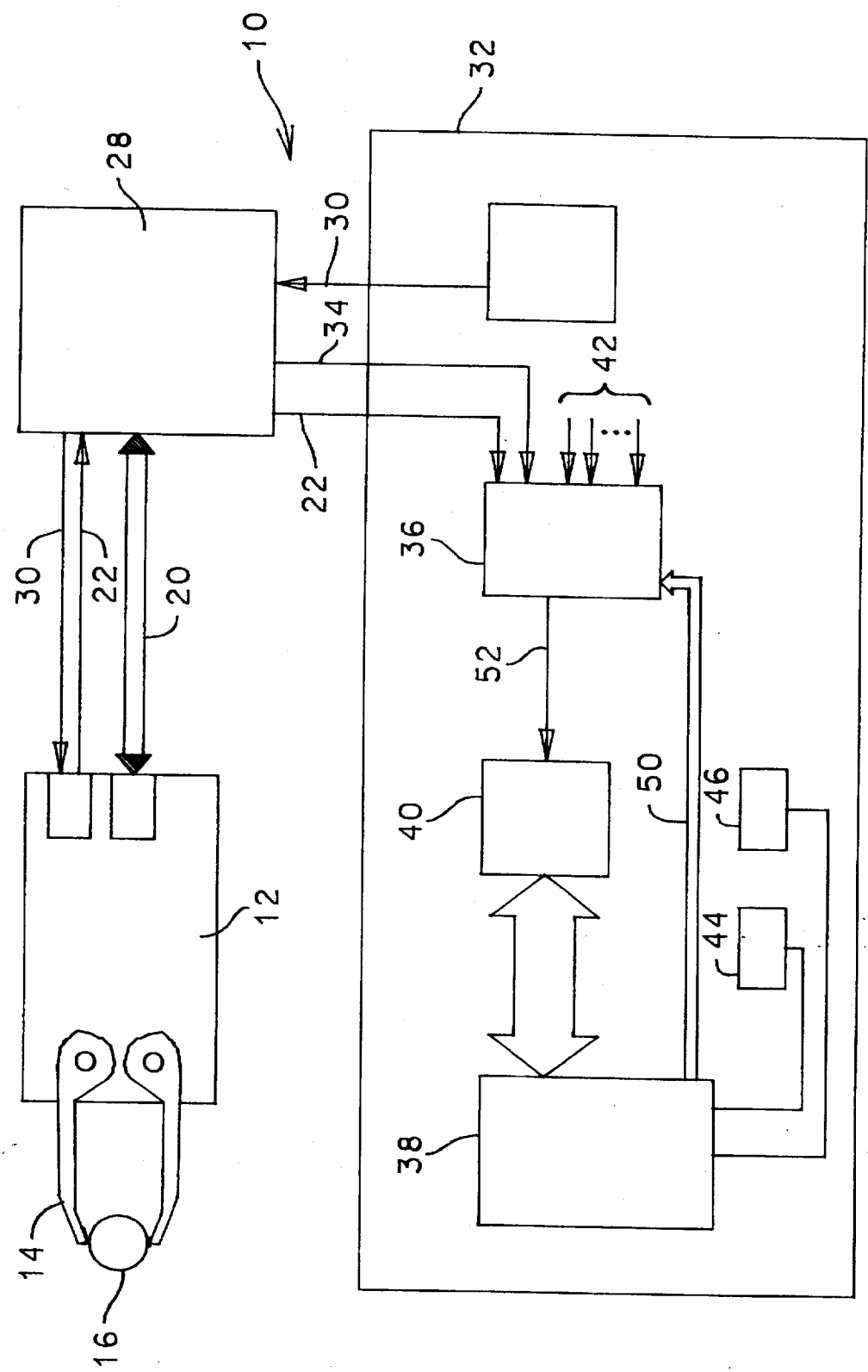
FIG. 2 is a partial schematic view of the gaging system of FIG. 1 showing the gage head, LVDT card and the mother board configuration.

Referring to FIGS. 1 and 2, the gaging system of the present invention, indicated generally at 10, comprises a gage head 12 having gage fingers 14 for measuring the size of a workpiece 16. For in-process applications, the gaging system 10 is used to measure the workpiece size while the workpiece 16 is being worked on by a grinder 18 or other similar machining or milling apparatus. A linear variable differential transformer (LVDT) transducer which reads the gage fingers 14 and produces an LVDT signal 20 indicative of the separation of the gage fingers 14 and a temperature probe which reads gage temperatures and produces a temperature signal 22 indicative of the gage temperature are located inside the gage head 12. The signals 20, 22 are sent to a monitor 24 which converts and displays the information. The monitor 24 may also forward the information to a controller 26 which controls the operation of the grinder 18 based on part size information sent from the monitor 24. Monitors 24 can be configured to receive several gage head outputs simultaneously.

The gaging system 10 is configured to run in either a measurement mode or a calibration mode. The measurement mode is provided to monitor workpiece size and to control the grinder 18. The calibration mode is provided for uniquely calibrating the gaging system 10 to compensate for variations in temperature.

The calibration procedure can be conducted on stationary or moving gages. An output can be provided during calibration to advance and retract the gage head 12. In the calibration mode, the system 10 is setup by placing the gage fingers 14 on a part 16 of known size and zeroing the system 10 to this size. After the system 10 has been zeroed, temperature calibration is conducted to determine the temperature response characteristics of the gaging system 10 and the part 16. Temperature calibration is accomplished by taking temperature and part size offset readings at predetermined time intervals for stationary gaging systems or once a cycle for moving gaging systems. A table of accumulated sums is kept for each temperature, as well as a table of the number of readings taken at each temperature. These two tables are used to calculate the average part size for all of the temperatures read.

The temperature calibration period ranges anywhere from twenty-four hours to as long as two weeks. If there has not been a sufficient enough temperature change (approximately ten degrees Fahrenheit in the preferred embodiment) over the temperature calibration period, the calibration is considered invalid. If there is sufficient data, a temperature profile table is generated. The table is organized so that for any given temperature, a calculated offset is provided.

Figure 3:
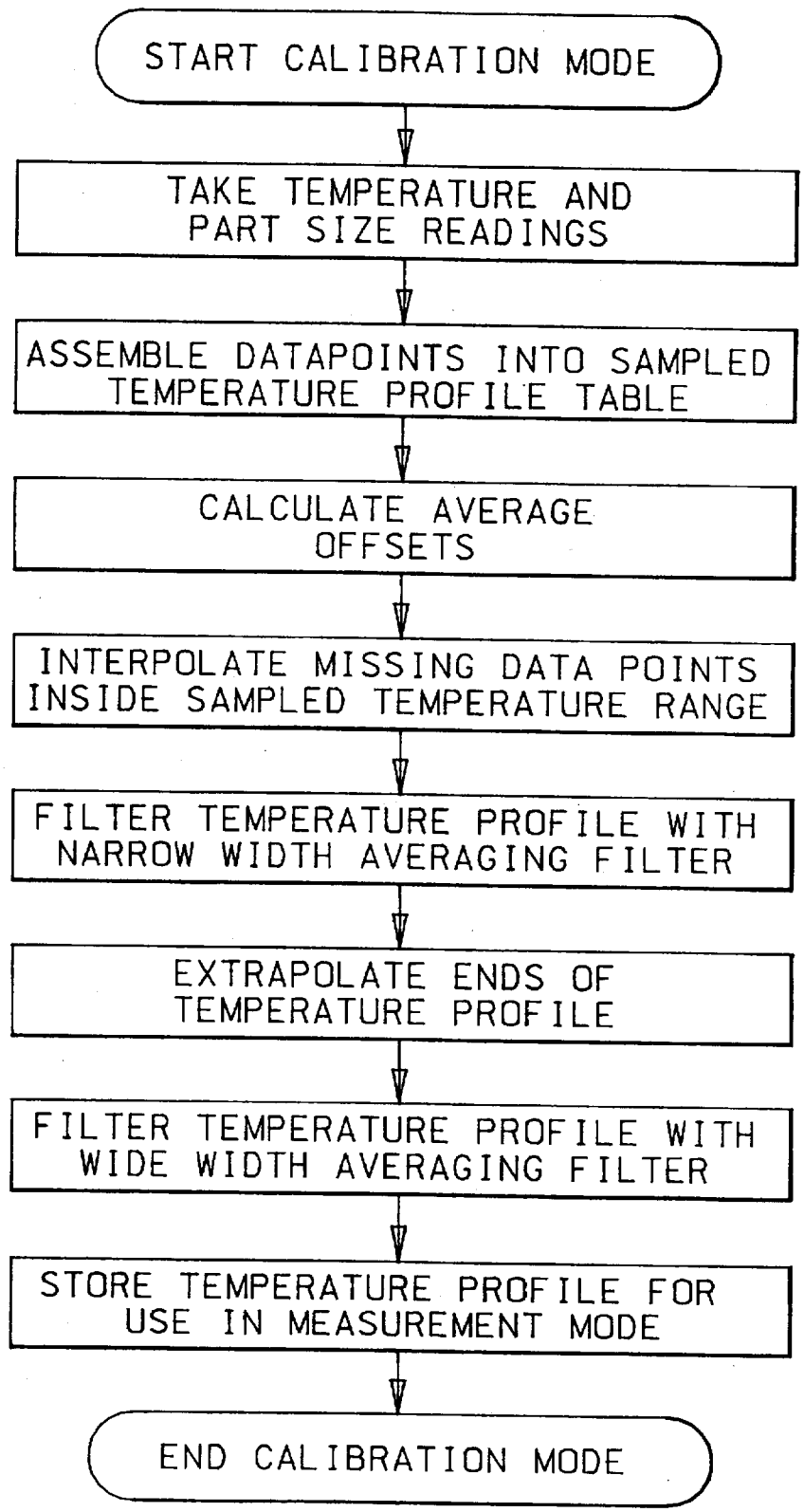
FIG. 3 is a flowchart showing the operation flow of the calibration mode used for calibrating the gaging system of FIG. 1.

The temperature profile table is generated in several steps, as illustrated in the flow chart of FIG. 3, beginning with taking sample readings and assembling the readings into a sampled temperature profile table. The LVDT transducer (not shown) included in the gage head 12 is configured to take part size measurements and to produce an LVDT signal 20 indicative of the part size. The LVDT signal 20, a complex A/C voltage signal, is sent to an LVDT card 28 included in the monitor 24. The LVDT card 28 converts the LVDT signal 20 into a DC voltage 34.

Preferably, the temperature probe comprises a thermistor which measures the gage head temperature as a function of resistance. A reference current 30 is supplied via the LVDT card 28 to the thermistor by a mother board 32 in the monitor 24. The thermistor converts the reference current 30 into a temperature signal 22, a DC voltage, which varies with the temperature of the thermistor. The temperature signal 22 returns to the motherboard 32 via the LVDT card 28, where it is read in a similar manner as the LVDT voltage 34 and is used in conjunction with the LVDT voltage 34 to create a table in which specific gage head offsets are correlated to specific values of the temperature signal (thermistor voltage) 22. The monitor 32 can be configured to receive multiple gage heads 12, and each such gage head 12 which incorporated the temperature compensation feature uses 2 gage input channels on the motherboard 32: one for the LVDT voltage 34 and one for the temperature signal 22 from the thermistor installed in the same gage head 12. A separate reference current 30 is provided for each gage head 12 which incorporates the temperature compensation feature.

The LVDT and temperature voltages are received by a multiplexer 36 on the mother board 32. The multiplexer 36 is controlled by a central processing unit (CPU) 38 on the mother board 32 and acts as a switch used for selecting and forwarding a multiplexer input to an analog to digital converter (A/D converter) 40 also included on the mother board 32. LVDT and temperature signals 42 received from other gage heads can also be received and switched by the multiplexer 36.

Calibration software for building and maintaining the temperature profile is stored in Erasable Programmable Read-Only Memory (EPROM) 44 on the mother board 32 and the CPU 38 is configured to execute the calibration software instructions. Non-volatile, battery-backed RAM 46 is also provided on the mother board for storing the generated temperature profiles for later use.

The temperature and LVDT voltages, 22 and 34 respectively, are constantly being supplied to the multiplexer whenever the gaging system 10 is on. The calibration software is written to instruct the CPU 38 to read the signals at predetermined intervals. In response to calibration software instructions, the CPU 38 sends select signals 50 to the multiplexer 36 instructing the multiplexer 36 to forward the appropriate signal to the A/D converter 40. The A/D converter 40 converts the selected voltage signal 52 into a digital value. The CPU 38 then reads the digital value from the A/D converter 40.

When building the sampled temperature profile, the CPU 38 reads temperature and part size offset data from the A/D converter 40 at predetermined intervals and stores the data as data points in table format in the RAM 46. FIG. 4 is an example of a typical sampled temperature profile. As shown in FIG. 4, a sampled temperature profile table consists of accumulated sums 54 of part size measurements taken at each temperature 56, as well as the number of readings 58 taken at that temperature. It should be noted that FIGS. 4-6 are merely schematic views of a small portion of the actual temperature profile tables of the present invention. The CPU 38 doesn't actually convert the temperature signal into a temperature value in degrees, only the thermistor voltages, which varies with temperature measured and stored in the tables. Furthermore, in the preferred embodiment, the actual tables contain a minimum of 256 data points per table.

After the temperature sampling is complete, missing data points in the sampled temperature profile are interpolated. For example, as shown in FIG. 4, it is possible to complete a sampling cycle having a valid temperature range which contains temperatures at which no readings were taken. In this case, the missing data point entry 60 is interpolated by summing the data points directly above 62 and below 64 the data point to be interpolated 60. FIG. 5 is an example of the sampled temperature profile of FIG. 4, with data point 60 interpolated from data points 62 and 64. The accumulated part size offset of data point 60 is interpolated by summing the accumulated part size offset sums of data points 62 and 64. The number of readings of data point 60 is interpolated by summing the number of readings of data points 62 and 64.

After all missing data points have been interpolated, a temperature offset profile table is calculated by dividing the accumulated sums at each temperature by the number of readings taken at that temperature. FIG. 6 is an example of the temperature offset profile table corresponding to FIG. 5. The size offset of entry 60, for example, is calculated by dividing the accumulated sum of entry 60 (0.000278) by the number of readings (12) recorded in entry 60.

Figure 7:
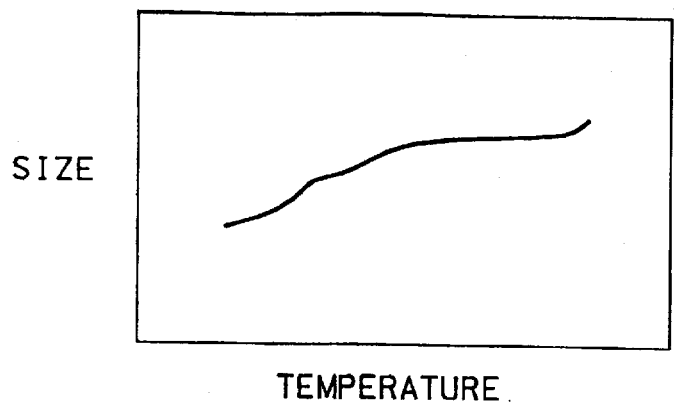
FIG. 7 is a graphical view of a rough temperature profile according to the present invention.

After the temperature offset profile table has been calculated, the calibration software instructs the CPU 38 to filter the temperature profile using a narrow width averaging filter. FIG. 7 is an example of a typical temperature profile, shown in graphical form, prior to filtering the profile. The filter is designed to smooth the temperature offset profile to eliminate inconsistencies in the profile.

Figure 8:
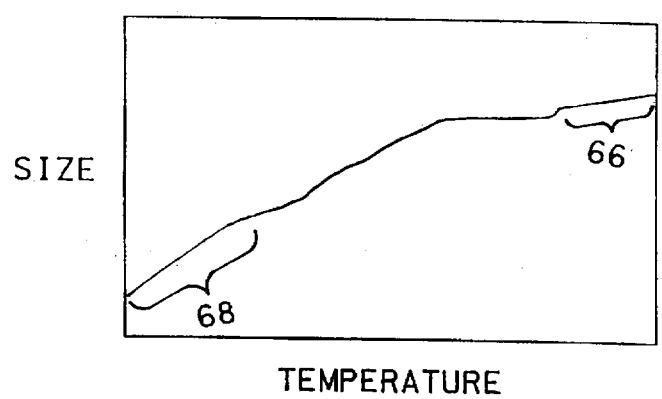
FIG. 8 is a graphical view of the temperature profile of FIG. 7 including extrapolated extending ends.

The ends of the filtered temperature profile 66 and 68 are then extrapolated out to the limits of the available measurement span by extending the extremes of the sampled profile. FIG. 8 illustrates the temperature profile of FIG. 7 with extrapolated ends. The extrapolation is done using the average slope of the profile near each extreme. The slope is calculated by dividing the sum of size offsets near the end of the profile by the sum of the temperatures for a predetermined number of data points near the end of the profile.

Figure 9:
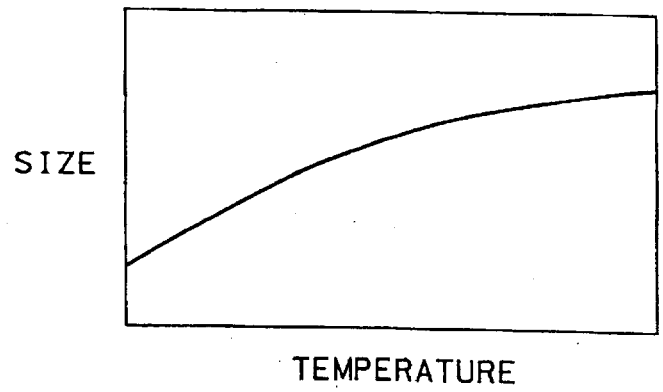
FIG. 9 is a graphical view of the temperature profile of FIG. 8 after being subjected to a smoothing filter.

The calibration software then instructs the CPU 38 to filter the extended temperature profile with a wide band averaging filter. FIG. 9 is an example of the temperature profile of FIG. 8 after being smoothed by a wide width averaging filter. Once again, the filter is designed to smooth out any inconsistencies in the temperature profile Finally, the calibration software instructs the CPU 38 to store the completed temperature profile in non-volatile RAM 46. The calibration mode is complete after the temperature profile is stored and the gaging system 10 is ready for operation.

In the measurement mode, the gaging system 10 is configured to take part size and temperature measurements and adjust the part size measurements by precalculated offsets stored in the temperature profile. The adjusted measurements can be displayed by the monitor 24 or can be used for other purposes such as for controlling a grinder 18 or other milling or machining apparatus.

The measurement control software controls the operation of the gaging system while in measurement mode. The temperature voltage 22 and LVDT voltage 34 are constantly supplied to the multiplexer 36. The measurement control software instructs the CPU 38 to switch the multiplexer 36 and read temperature and LVDT values from the A/D converter 40 at predetermined intervals. In the preferred embodiment, the LVDT value is read about 100 times per second. However, because the temperature changes relatively slowly, the temperature value is read only about 2 times a second. Every time the temperature is read, the measurement control software instructs the CPU 38 to look up a part size offset corresponding to that temperature in the temperature profile. Every LVDT measurement taken is adjusted by the current part size offset, determined by the latest temperature reading, The adjusted part size is then displayed on the monitor 24 and/or forwarded to a controller 26 for controlling a grinder 18 or other machining or milling apparatus.

It is to be understood that the invention is not limited to the exact construction illustrated and described above, but that various changes and modifications may be made without departing from the spirit and scope of the invention as defined in the following claims.

We claim:

1. A self-calibrating, temperature-compensating gaging system for accurately measuring a part size, the system comprising:

at least one gage finger configured to engage the part;

a linear variable differential transformer transducer operably connected to said at least one gage finger for reading a position of said gage finger and producing an LVDT signal indicative of the part size based on said gage finger position;

sensor means for measuring temperature of said gage finger and producing a temperature signal indicative of gage finger temperature;

calibration means for receiving said LVDT signal and said temperature signal and for creating a temperature profile unique to said gaging system while said gaging system is in a calibration mode, wherein said gaging system is zeroed on a pad of known size and subjected to a range of temperatures and said calibration means stores size offsets obtained from said LVDT signal at temperatures within said temperature range thus creating said temperature profile;

correction means for receiving said LVDT signal and said temperature signal and correcting said LVDT signal by reading a size offset corresponding to said temperature signal from said temperature profile and adjusting said LVDT signal by said size offset, while said gaging system is in a measurement mode.

2. A gaging system according to claim 1 wherein said calibration means further comprises:

means for reading said temperature signal at predetermined time intervals over an extended period of time in which said gaging system temperature varies over a sampled temperature range;

means for reading said LVDT signal at said predetermined time intervals, wherein said size offset is determined by said LVDT signal at a sampled temperature;

means for creating data points containing a size offset at a sampled temperature;

means for creating said temperature profile from said data points.

3. A gaging system according to claim 2 wherein said calibration means further comprises:

means for interpolating data points for points inside said sampled temperature range for which temperature and size offsets were not recorded.

4. A gaging system according to claim 3 wherein said means for interpolating further comprises:

means for averaging the size offsets of a data point having a measured temperature just above a data point to be interpolated and a data point having a measured temperature just below said data point to be interpolated.

5. A gaging system according to claim 3 wherein said calibration means further comprises:

means for filtering said temperature profile with a narrow width averaging filter to smooth said temperature profile.

6. A gaging system according to claim 5 wherein said calibration means further comprises:

means for extrapolating data points for points outside said sampled temperature range to expand said smoothed temperature profile.

7. A gaging system according to claim 6 wherein said calibration means further compresses:

means for filtering said expanded temperature profile with a wide width averaging filter having a wider bandwidth than said narrow averaging filter to smooth said expanded temperature profile.

8. A gaging system according to claim 6 wherein said means for extrapolating further comprises:

means for calculating an average upper-end slope of the temperature profile at an upper end of the sampled temperature range;

means for extending the upper end of said temperature profile out as a straight line at said calculated average upper-end slope;

means for calculating an average lower-end slope at a lower end of the sampled temperature range;

means for extending the lower end of said temperature profile out as a straight line at said calculated average lower-end slope.

9. A gaging system according to claim 1 wherein said calibration means further comprises:

means for counting the number of size offsets readings taken at each temperature;

means for creating an accumulated sum of said size offsets for each temperature, said sum containing an accumulated sum of all size offsets taken at that temperature;

means for calculating an average size offset for each temperature by dividing the accumulated sum at each temperature by the number of readings taken at that temperature.

10. A gaging system according to claim 1 wherein said temperature profile is stored in a table format in said gaging system.

* * * * *

UNITED STATES PATENT AND TRADEMARK OFFICE
CERTIFICATE OF CORRECTION

PATENT NO. : 5,689,447
DATED : November 18, 1997
INVENTOR(S) : Mark Ward

It is certified that error appears in the above-indentified patent and that said Letters Patent is hereby corrected as shown below:

Column 6, Claim 1, line 46, "pad" should read --part--.

Signed and Sealed this

Twenty-sixth Day of May, 1998

Attest:

BRUCE LEHMAN

Attesting Officer

Commissioner of Patents and Trademarks